United States Patent [19]
Lethellier

[11] Patent Number: 4,975,821
[45] Date of Patent: Dec. 4, 1990

[54] HIGH FREQUENCY SWITCHED MODE RESONANT COMMUTATION POWER SUPPLY

[76] Inventor: Patrice R. Lethellier, 11235 Richland Ave., Apt. 9, Los Angeles, Calif. 90064

[21] Appl. No.: 419,212

[22] Filed: Oct. 10, 1989

[51] Int. Cl.[5] ............................................. H02M 3/335
[52] U.S. Cl. ........................................ 363/21; 363/97; 363/56
[58] Field of Search ................ 363/18, 19, 20, 21, 363/56, 75, 95, 97

[56] References Cited

U.S. PATENT DOCUMENTS

| | | | |
|---|---|---|---|
| 4,007,413 | 2/1977 | Fisher et al. | 363/18 |
| 4,253,136 | 2/1981 | Nanko | 363/21 |
| 4,318,164 | 3/1982 | Onodera et al. | 363/21 |
| 4,642,750 | 2/1987 | Raets | 363/21 |
| 4,648,016 | 3/1987 | Peruth et al. | 363/97 |
| 4,788,634 | 11/1988 | Schlecht et al. | 363/21 |

FOREIGN PATENT DOCUMENTS 0147777  7/1986  Japan .

*Primary Examiner*—Peter S. Wong

[57] ABSTRACT

A forward switched mode converter power supply of a resettable type, in which leakage inductance in the input circuit, the parallel inductance of the transformer and the parasitic capacitance of the switching means provides a resonant circuit for recirculating commutation energy, so that the voltage across the switching means is reduced essentially to zero at the beginning of each switching cycle to prevent loss of the commutation energy.

4 Claims, 4 Drawing Sheets

HIGH FREQUENCY SWITCHED MODE RESONANT COMMUTATION POWER SUPPLY

BACKGROUND OF THE INVENTION

It is desirable in the switched mode power supply art for the size of the power supplies to be as small as possible. However, in order to reduce the size of such power supplies, their operating frequency must be increased to a relatively high level. However, when the operating frequencies exceed 100 kilo Hertz, for example, the parasitic impedances of the various components of the power supply, such as the parallel capacitance of the electronic switches, and the leakage inductance of the transformers, become significant and can no longer be regarded as negligible second order quantities.

In the conventional prior art switched mode power supply, the parasitic impedances referred to above, must be discharged and reset during each operational cycle. This creates commutation losses, adds voltage and current stresses to the switches, and decreases the overall efficiency of the power supply. Accordingly, any attempt to decrease the size of the usual prior art switched mode power supply by increasing its operational frequency generally has not been completely successful.

Resonant switch mode power supplies have been proposed in the prior art in an attempt to minimize the parasitic impedance effects as the operating frequency is increased. However, the prior art switched mode resonant power supplies are subject to certain drawbacks. For example, the switching frequency is not stable and has a tendency to vary with changes in load and line voltage.

Also, in order to minimize the size of the resonant elements in the resonant power supplies, the switching frequency is sometimes increased to over 1 megaHertz, and this results in ferrite commutation losses.

In addition, the switching elements of the usual prior art switched mode resonant power supplies are often stressed with peak voltages and/or currents of up to three times normal values.

There is also a substantial amount of recirculating energy in the prior art switched mode resonant power supplies which is not transferred to the output. This unused recirculating energy creates losses which militates against the achievement of a small size efficient power supply.

SUMMARY OF THE INVENTION

The present invention incorporates resonance techniques into a particular type of forward switched mode converter power supply which operates at constant frequency and in a resonant commutation mode. Only the commutation energy, which is usually dissipated in snubbing networks in the prior art power supplies and not used, is recirculated in the power supply of the invention. The power supply of the invention is capable of operating at a constant switching frequency independent of variations in load or line voltage, and it is subject to usual pulse width modulation control. The power supply of the invention exhibits minimal magnetic losses, and its resonant components may be of minimal size. The power supply of the invention exhibits extremely low voltage and current stress on its switches, and it exhibits higher frequency than conventional pulse width modulation converters or conventional resonant converters. Higher frequency is now possible because the usual snubber and parasitic capacitor energy is now recirculated and is no longer a loss.

DETAILED DESCRIPTION OF THE PREFERRED EMBODIMENT

Figure 1:
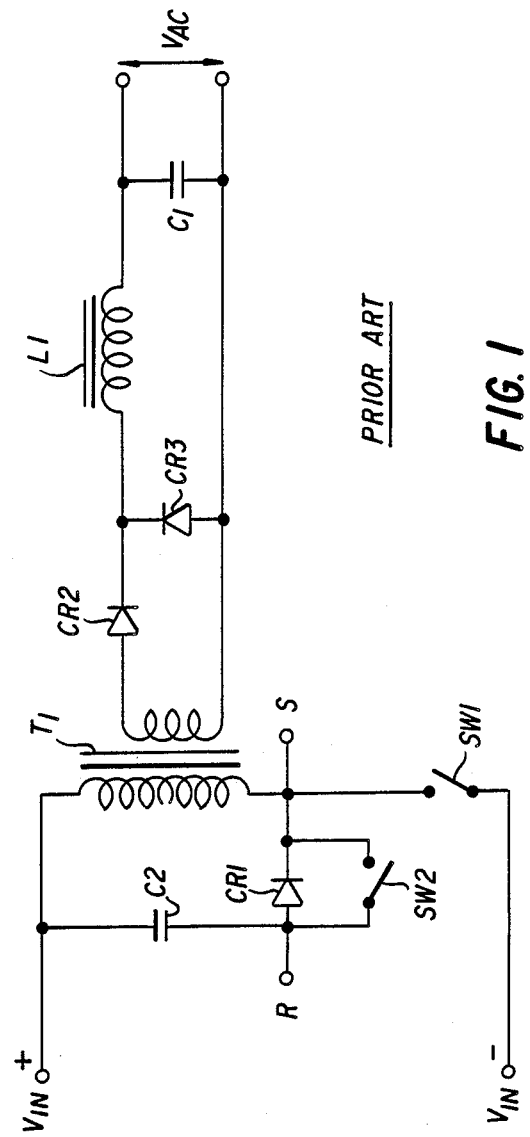
FIG. 1 is a circuit diagram of a portion of a typical prior art switched mode converter power supply similar to the forward converter circuit described in Copending Application Ser. No. 383,594, filed July 24, 1989, in the name of Bruce Wilkinson, and assigned to the present Assignee.

FIG. 1 shows a prior art forward converter which, as stated above, is similar to the forward converter described in Copending Application Ser. No. 383,594. In the circuit of FIG. 1, $T_1$ is an isolation transformer with a primary winding. An input circuit is connected to the primary winding so that a direct current input voltage $V_{in}$ may be applied across the primary winding through an electronic switch SW1. A second electronic switch SW2 is connected across diode CR1 which, when closed, permits current flow in the opposite direction.

As described in the Copending Application, the circuit of FIG. 1 is similar to the typical prior art forward converter except for the addition of capacitor C2 and Switch SW2. Switch SW2 is an active switch similar to switch SW1, but of a much lower power rating. Switch SW2 is controlled by a comparator circuit (not shown) so that when the voltage across capacitor C2 exceeds a particular reference voltage, switch SW2 turns on; and when the voltage across capacitor C2 is less than the reference voltage switch SW2 turns off.

When switch SW1 turns off, the voltage across the primary of transformer $T_1$ rises until diode CR1 conducts. The energy stored in the inductance of transformer $T_1$ is now delivered to capacitor C2, thereby charging C2 above the reference voltage. Because the voltage across C2 is greater than the reference voltage, switch SW2 is turned on. When switch SW2 is turned on, the voltage on the primary $T_1$ remains connected to C2 after the inductive current reverses. Capacitor C2 then discharges into transformer $T_1$ until the voltage on C2 is equal to the reference voltage. Switch SW2 then turns off, releasing the primary of transformer $T_1$ from capacitor C2.

Because capacitor C2 is discharged back to its starting voltage, all of the energy, except for losses in diodes CR1 and switch SW2, is returned to the inductance of the transformer $T_1$. Since the inductive current has reversed during this process, the transformer core has also had its flux reversed. Therefore, the limitation of only being able to use half of the flux capacity of the core in the forward converter has been overcome, resulting on the feasibility of a smaller transformer for a given power level, as compared with most prior art forward converters.

The value of capacitor C2 is chosen to be large enough so that, when transformer $T_1$ delivers its energy to capacitor C2 the voltage changes only a few percent, therefore the voltage across capacitor C2 may be considered essentially constant and equal to the reference voltage. The reference voltage is simply used as a reference, and the reference voltage source does not have to dissipate any power.

One side of the secondary winding of transformer $T_1$ is connected through a diode CR2 and through a filter inductor L1 to one of the output terminals of the circuit. The other side of the secondary winding is directly connected to the other output terminal. The output voltage VAC appears across the output terminals. A diode CR3 is connected between the junction of diode CR2 and inductor L1 and the other side of the secondary winding. A capacitor C1 is connected across the output terminals.

Figure 2:
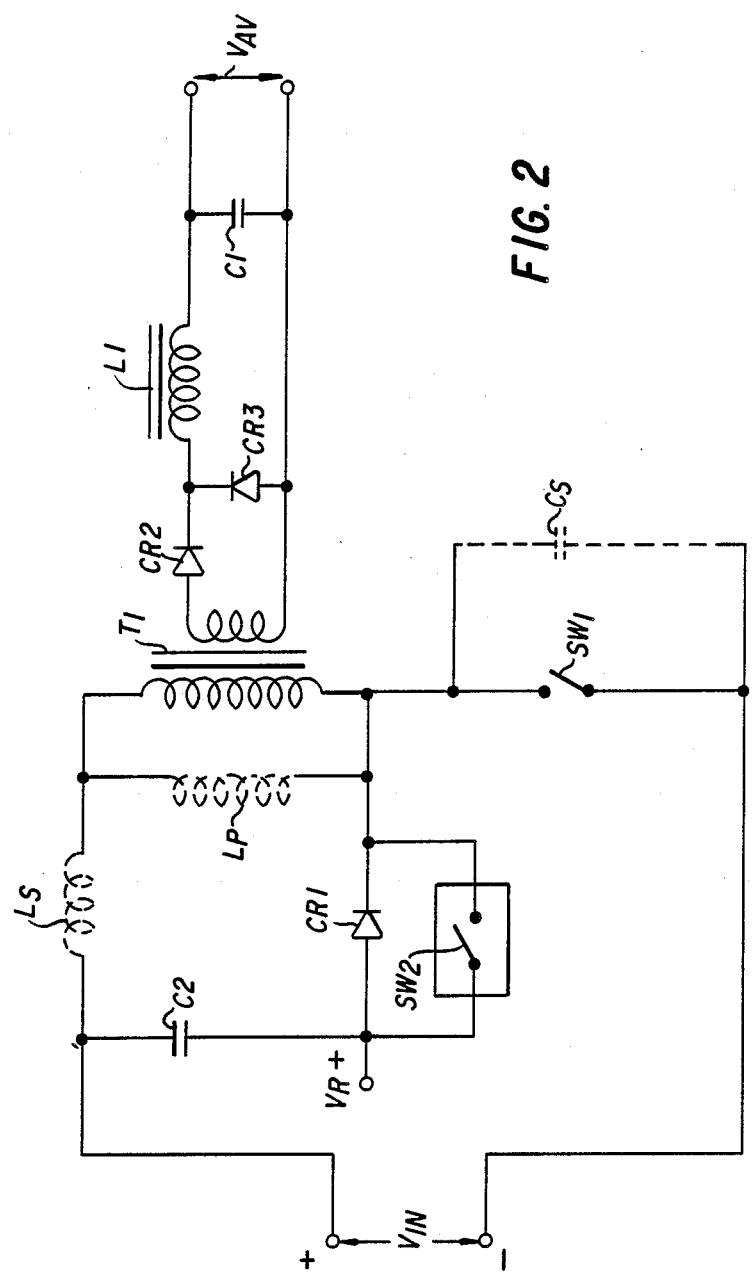
FIG. 2 is a circuit diagram of a power supply of the same general type as the power supply of FIG. 1, modified in accordance with the teachings of the present invention.

The circuit of FIG. 2 is a modification of the circuit of FIG. 1, in accordance with the teaching of the present invention.

The circuit of FIG. 2 is a forward converter in which the primary winding of an isolation transformer $T_1$ is connected to an input circuit whose input terminals are connected to a source of direct current potential $V_{in}$. The input circuit includes an electronic switching circuit designated SW1 which is connected to one side of the primary winding of transformer $T_1$, with the other side of the primary winding being returned to the positive terminal of the input circuit. The serial leakage inductance of the input circuit is designated $L_s$, whereas the parallel inductance of the primary of transformer $T_1$ is designated $L_p$. The parallel inductance of the primary may be adjusted by varying the gap of the core of the transformer $T_1$, without the need for an additional component.

The input circuit includes a capacitor C2 which is connected to the primary of transformer T1 through a diode CR1. The junction of the diode and the capacitor is connected to the positive terminal of a direct current reset voltage source VR+. A switch SW2 is connected across diode CR1, and that switch is controlled by a second drive circuit. The function of the second drive circuit is to modify the reset voltage to provide a dead time small enough to achieve resonant commutations. The parasitic capacity of the switching circuit SW1 is designated $C_S$.

In the operation of the circuit of FIG. 2, and as described in the Copending Application, when switch SW1 is turned "off", the voltage across the primary of transformer $T_1$ rises until diode CR1 conducts. The energy stored in the inductance of transformer $T_1$ is delivered to capacitor C2, thereby charging capacitor C2 to turn on switch SW2. When switch SW2 is turned on, the voltage on the primary of transformer $T_1$ remains connected to capacitor C2 after the inductive current reverses. Capacitor C2 then discharges into the transformer $T_1$. Switch SW2 then switches to its "off" state, releasing the primary of transformer $T_1$ from capacitor C2.

Because capacitor C2 is discharged back to its starting voltage, all of the energy except for losses in diode CR1 and in switch SW2 is returned to the inductance of transformer $T_1$. Since the inductive current is reversed during this process, the transformer core has had its flux reversed. Therefore, the limitation of only being able to use half of the flux capacity of the core in a forward converter has been overcome, resulting in the feasibility of utilizing a smaller transformer for a given power level, as compared with most prior art forward converters. In the circuit of FIG. 2 the leakage inductances $L_S$ and $L_P$, together with the parasitic capacitance $C_S$ form a resonant circuit for the circulating commutation current. This means that the commutation energy stored in the leakage inductance in the input circuit is transferred to the parasitic capacitance of the switching means SW1 during each operational cycle of the power supply.

The operation of the power supply represented by the circuit of FIG. 2 may best be understood by reference to the curves of FIGS. 3-6.

Figure 3:
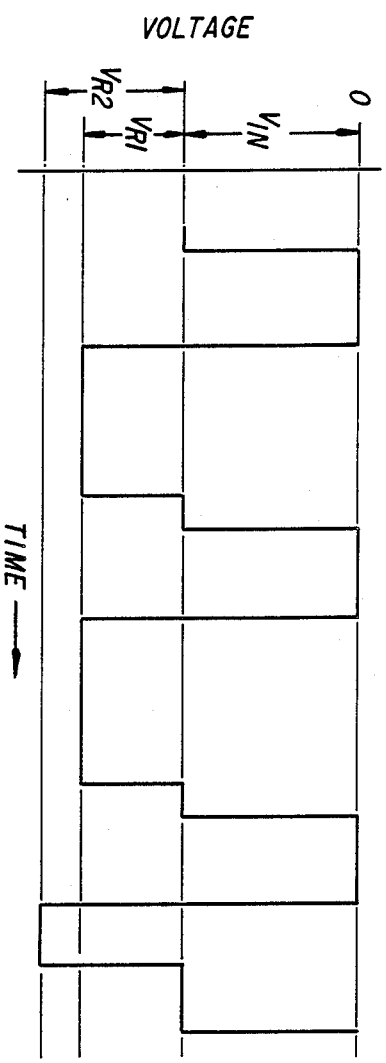

The curve of FIG. 3 represents the voltage across switch SW1 in the absence of the leakage and parasitic impedances $L_S$, $L_P$ and $C_S$. As shown in the curve of FIG. 3, the reset duration may be changed by modifying the reset voltage, for example, from a value $V_{R1}$ to a value $V_{R2}$.

Figure 4:
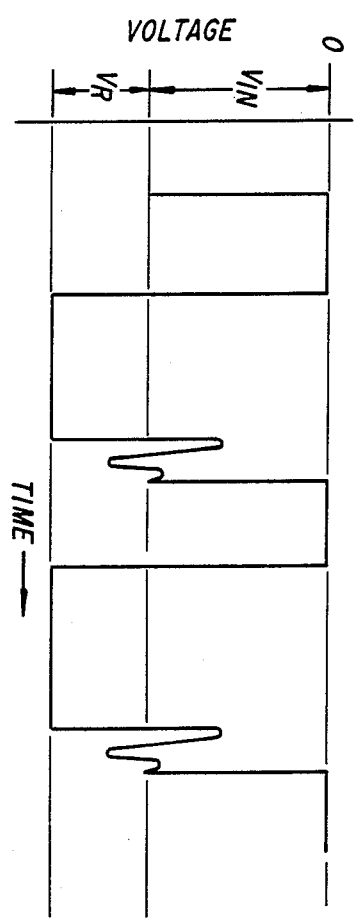
FIGS. 3, 4, 5 and 6 are curves useful in explaining the modifications of the operations of the circuit of FIG. 1 which result in the circuit of FIG. 2.

Then, if the leakage and parasitic impedance components are added into the circuit, progressively, for purposes of explanation, a first step representing, for example, 20% of the final value of the parasitic and leakage impedance elements is represented by FIG. 4. As shown in FIG. 4, a damped waveform occurs just before the switch SW1 is turned on at the end of each operating cycle because of resonance due to the parasitic inductance ($L_P$) of the transformer in conjunction with the parasitic capacitance ($C_S$) of switch SW1.

Figure 5:
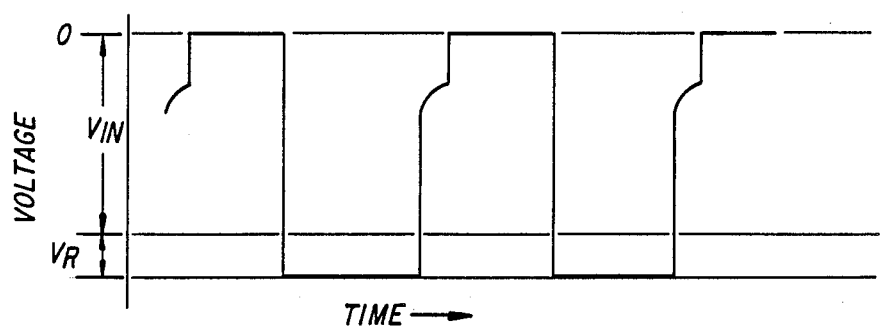

The next step is to modify the reset voltage $V_R$ in order to have the start of each cycle occur when the voltage across the switch is minimum. When this is achieved, the curve of FIG. 5 is obtained.

The final step in explaining the circuit is to increase the values of the parasitic and leakage impedances to their full and final value. External components may be added, if necessary, to achieve the desired final value of the inductance $L_P$ and capacitance $C_S$. This results in the curve of FIG. 6.

Figure 6:
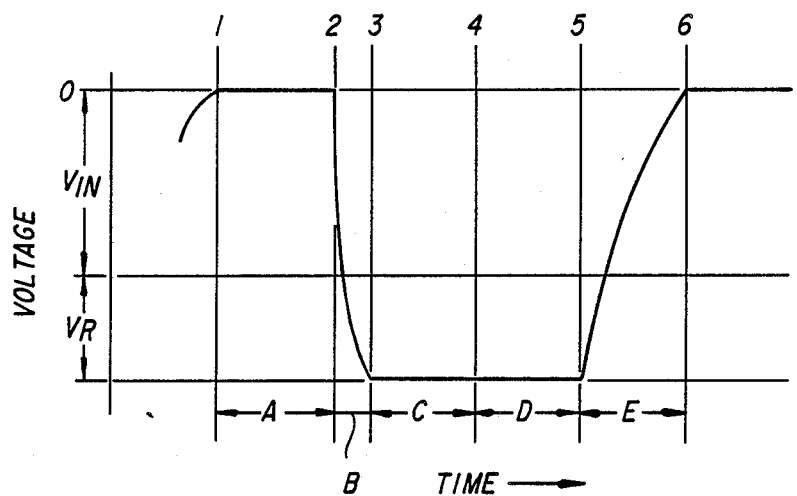

In the curve of FIG. 6, the number 1 represents the beginning of an "on" commutation of switch SW1. The switch remains on for interval A until point 2 is reached. During this on time, the parallel and leakage inductances $L_P$ and $L_S$ of transformer $T_1$ are charged with reactive energy. The switch is then turned off at point 2, and during the interval B between points 2 and 3, the reaction energy stored in the inductances $L_P$ and $L_S$ charges the parasitic capacitance $C_S$ of switch SW1. At point 3, the cycle reaches the reset voltage $V_R$ which is clamped by diode CR1. The diode conducts for the time interval C, during which the reaction energy is transferred to the reset capacitor $C_R$.

The diode CR1 stops conducting at the end of interval C, and at point 4 the switch SW2 closes and remains closed for a time interval D. During this interval, the energy stored in reset capacitor C2 is transferred to the parallel inductance to build up a negative current and reset the transformer T1.

Switch SW2 is turned off at point 5, and during interval E, the energy stored in the parallel inductance is transferred to the parasitic capacitance $C_S$, and the voltage across the switch is brought back to zero and the switch is ready for a loss-less commutation. It will be noted that the next cycle starts when the voltage across switch SW1 is zero, the reset voltage being continuously modified for that purpose. All of the energy stored in the parasitic capacitor $C_S$ is noncirculated for higher efficiency.

The invention provides, therefore, an improved forward converter capable of operating at high frequency and in a resonant commutation energy mode. The power supply of the invention is constructed to exhibit minimal magnetic losses and to require resonant components of minimal size. The power supply of the invention exhibits extremely low voltage and current stress on its switches.

It will be appreciated that while a particular embodiment of the invention has been shown and described, modifications may be made. It is intended in the claims to cover all modifications which come within the true spirit and scope of the invention.

I claim:

1. A switched power supply of the forward converter type including: an input circuit adapted to be connected to a source of direct current input potential; a transformer having a primary winding and a secondary winding, said primary winding being connected across said input circuit and exhibiting parallel leakage inductance in said input circuit in which commutation energy is circulating; a reset circuit adapted to be connected to a source of direct current reset potential; a reset capacitor included in said reset circuit and connected to one side of said input circuit; a first switching means included in said input circuit and series connected to said primary winding to be operated at a particular switching frequency, and in each cycle to cause current to flow in said primary winding from said source of direct current input potential for as long as said first switching means is closed, said first switching means exhibiting parasitic capacitance thereacross; a clamping diode included in said reset circuit and series connected to the junction of said first switching means and said primary winding; a second switching means included in said reset circuit and connected across said clamping diode; and control circuitry included in said reset circuit connected to said second switching means to cause said second switching means to close when said clamping diode is rendered non-conductive and to open when the voltage across said reset capacitor drops below a value which varies to achieve a dead time equal to a fraction of the period of the resonant commutation frequency; the parasitic capacitance of said first switching means forming a resonant circuit with said leakage inductance in said input circuit at the operating frequency of the power supply; and the commutation energy stored in said leakage inductance in said input circuit being transferred to the parasitic capacitance of said first switching means during each operational cycle of the power supply.

2. The switched power supply defined in claim 1, in which the reset potential of said reset potential source is selected to cause the commutation energy stored in said leakage inductance of said input circuit to bring the voltage across the parasitic capacitance of said first switching means essentially to zero at the beginning of each operational cycle of the power supply.

3. The switched power supply defined in claim 1, and which includes an inductor connected in series with the primary winding to augment the leakage inductance in said input circuit.

4. The switched power supply defined in claim 1, and which includes a capacitor connected across said first switching means to augment the parasitic capacitance thereof.

* * * * *